P. W. ALLEN.
MANUFACTURE OF GRAPE SUGAR.
APPLICATION FILED FEB. 17, 1919.

1,422,328.

Patented July 11, 1922.

UNITED STATES PATENT OFFICE.

PAUL W. ALLEN, OF CEDAR RAPIDS, IOWA, ASSIGNOR, BY MESNE ASSIGNMENTS, TO PENICK & FORD, LTD., INCORPORATED, A CORPORATION OF DELAWARE.

MANUFACTURE OF GRAPE SUGAR.

1,422,328.      Specification of Letters Patent.      Patented July 11, 1922.

Application filed February 17, 1919. Serial No. 277,579.

*To all whom it may concern:*

Be it known that I, PAUL W. ALLEN, a citizen of the United States, residing at Cedar Rapids, in the county of Linn and State of Iowa, have invented certain new and useful Improvements in the Manufacture of Grape Sugar, of which the following is a specification.

My invention relates to the manufacture of grape sugar, especially grape sugar made from corn starch; and the primary objects of the invention are to simplify, shorten and reduce the cost of manufacture of the product and to improve and give to the product certain desirable properties, to-wit, dryness, white color, freedom from bitter taste and capacity for being reduced to a fine powder, by subjecting the converted liquor to certain treatment subsequent to concentration and prior to crystallization.

A further object of the invention is to improve upon the method of manufacturing grape sugar disclosed in the application of Adolph W. H. Lenders and Paul W. Allen filed November 18, 1918, Serial No. 263,026.

In accordance with my present invention the starch in a mixture with water, is converted into sugar in any suitable manner, the starch being treated prior to conversion, to eliminate the residual protein substances contained ordinarily in commercial starches, the purifying treatment being preferably that disclosed in the Lenders & Allen application just referred to and consisting in the liquefaction of the protein by action of proteolytic bacteria and the removal of the liquefied substances. After the starch has been purified in this manner the liquor is next concentrated to a rather thick syrup and is then beaten while still hot, to a porous, frothy consistency resembling whipped cream. The sugar is allowed to harden and crystallize while in this state, the product being in the form of a hard but white porous cake which may, if desired, be reduced to a very fine, dry powder that will retain its dryness. The sugars manufactured by this method will be white in color and free from the bitter taste frequently possessed by grape sugar made from corn starch.

The drawing shows a suitable apparatus for beating and at the same time cooling the sugar liquor. It will be understood that the invention is not limited to the use of an apparatus so constructed. The beating or frothing of the liquor just precedent to crystallization may be effected by any means suitable for the purpose.

In the drawing—

Figure 1:
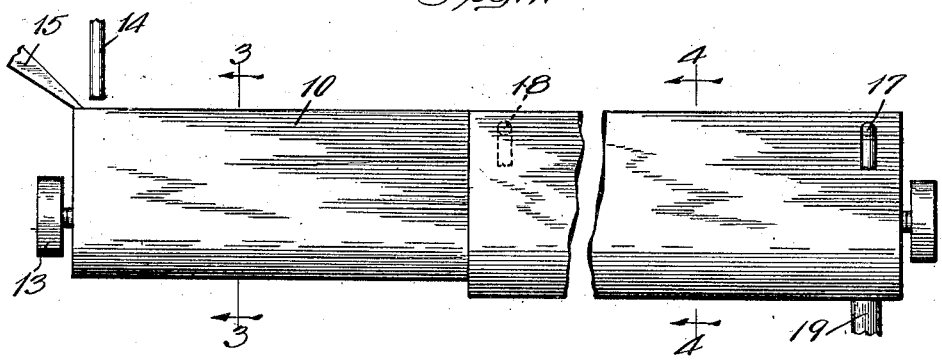
Fig. 1 is a side elevation of the beating apparatus.
Figure 2:
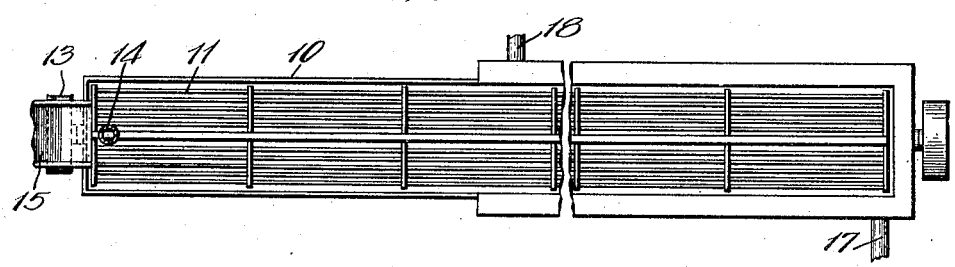
Fig. 2 is a plan view.
Figure 3:
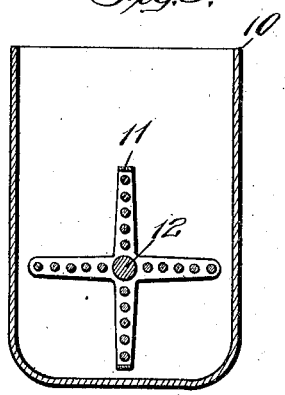
Figure 4:
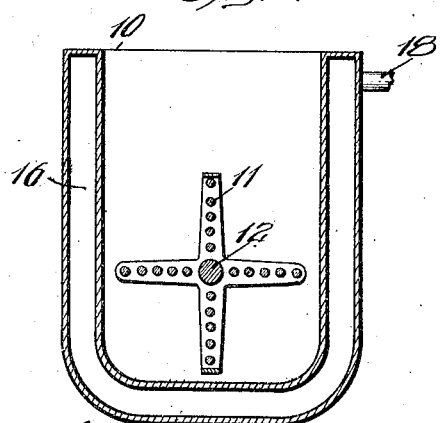

Figs. 3 and 4 are cross sectional views on an enlarged scale, taken on lines 3—3 and 4—4 of Fig. 1.

Referring to the drawing, the beating apparatus comprises a vessel or trough 10 slightly inclined, say from left to right, in which is arranged a revoluble beater 11, the shaft 12 of which is provided, preferably at each end, with a belt pulley 13. The converted liquor, while still hot from the vacuum pan in which it is concentrated, is run into the vessel 10 through pipe 14. It is preferable to have the liquor concentrated to about 42° Baumé and at a temperature of about 145° Fahrenheit at the time it enters the beater. In order to facilitate the crystallization, which takes place after the beating operation, it is desirable to seed the liquor with seeding crystals while the liquor is in the vessel 10. The seeding crystals may be fed into the vessel through a spout 15. The lower or right hand end of the vessel 10 is surrounded by a water jacket 16 to which water is supplied through pipe 17 and from which water is discharged through pipe 18. The sugar liquor is beaten and mixed with air by the revoluble beater 11 until it is given a porous, frothy consistency resembling whipped cream. In this state it is discharged from vessel 10 through the discharge spout 19. It is important that the beating of the liquid should not be continued after the liquor reaches the consistency described as under further beating the froth will return to a liquid state in which it is quite difficult to crystallize. While it is perhaps not essential to artificially cool the material as it passes through the beater, this reduction of temperature, which it will be observed takes place at the discharge end of the beating apparatus, is very desirable as it helps to keep the sugar in the frothy state while being run into the crystallizing vessel which is the next step in the process. The sugar, when treated as above described, will harden and crystallize within about twelve hours after it has been run into the molds. The product will be in the form of a hard but porous substance which, when dry, may be ground to a fine, dry, non-hygroscopic powder.

It is important, if a product of this character is to be produced, to eliminate all of the protein impurities from the material before crystallization takes place. If the sugar contains even small quantities of protein matter it will be damp enough so that it cannot be reduced to a finely pulverulent state, or at least to a fine powder which will retain its dryness. The elimination of the protein impurities (and it may be remarked that all commercial starches contain a small but appreciable amount of protein matter), is best accomplished by purifying the starch, prior to conversion, in accordance with the method set forth in the Lenders and Allen application above referred to. According to this method the starch mixed with water is inoculated with bacteria of the *Bacillus putrificus* group, the particular organism best calculated to serve the purpose being group No. B.121.1233111 in accordance with the descriptive chart of the Society of American Bacteriologists endorsed by the society for general use at the annual meeting December 31, 1907. The starch liquor at the start of bacterial action should have at least two million bacteria per cubic centimeter. The material is agitated to thoroughly mix the germs and is then allowed to stand until the starch settles. The supernatant liquor is then drawn off, fresh water added and mixed with the starch, and the starch again allowed to settle, after which decantation of the liquor follows. These steps are repeated until the protein is entirely removed or reduced to an inappreciable minimum. By describing the starch as free from protein impurities I mean that the usual protein impurities as found in commercial starch are reduced to such a small quantity, if any remain at all, that their effect is inappreciable. During the entire operation the temperature is kept at from 100° to 105° Fahrenheit.

The starch may be converted by the ordinary method of acid hydrolysis. The converted liquor will be white and will, therefore, not require the usual filtering through animal charcoal. After conversion the liquor is concentrated in a vacuum pan to approximately a density of 42° Baumé and is then run into the beating vessel, as above described.

This method of manufacturing sugar besides giving a better product than has heretofore been produced in respect to color, taste and capacity for being reduced to a permanently dry, finely pulverulent state, has advantages from the point of view of economy of operation. The starch may be converted almost entirely into sugar, (97 to 98% dextrose,) and the whole yield of the conversion step can be crystallized. Moreover, the crystallizing step of the process is shortened from several days to a few hours, which means a great saving in floor space and mold pans, and a very material reduction in the amount of material which has to be kept in process of manufacture.

I claim:

1. Improvement in the method of manufacturing grape sugar from starch which consists in beating a sugar liquor which is free from protein impurities to a porous, frothy consistency, and allowing it to stand in this state until crystallization takes place.

2. Improvement in the method of making grape sugar from starch which consists in beating a sugar liquor which is free from protein impurities in the air and while the liquor is still hot to give it a porous, frothy consistency, and allowing the same to stand while in this state until crystallization takes place.

3. Improvement in the method of making grape sugar from starch which consists in subjecting a sugar liquor which is free from protein impurities at a temperature of about 145° Fahrenheit and at a density of about 42° Baumé, to a beating operation in the air, which gives the sugar a frothy, porous consistency, and then allowing it to stand until crystallization takes place.

4. Improvement in the method of making grape sugar from starch which consists in beating a sugar liquor which is free from protein impurities in the air and while the liquor is still hot to give it a porous, frothy consistency, cooling the material so that it will retain this consistency, and then allowing it to stand until crystallization takes place.

5. Improvement in the method of making grape sugar from starch which consists in beating a sugar liquor which is free from protein impurities in the air and while the liquor is still hot to give it a porous, frothy consistency, cooling the material during the latter portion of the beating operation, and then allowing it to stand until crystallization takes place.

PAUL W. ALLEN.